United States Patent [19]

Rapp et al.

[11] Patent Number: 4,631,178
[45] Date of Patent: Dec. 23, 1986

[54] METHOD OF REMOVING BORIC OXIDE FROM FLUE GASES

[75] Inventors: Charles F. Rapp, Newark; Robert A. Herrick, Maumme, both of Ohio

[73] Assignee: Owens-Corning Fiberglas Corporation, Toledo, Ohio

[21] Appl. No.: 485,972

[22] Filed: Apr. 18, 1983

[51] Int. Cl.⁴ .......................................... B01D 47/00
[52] U.S. Cl. ................................. 423/210; 423/240; 423/242; 423/244; 423/276; 423/277; 65/27; 65/134
[58] Field of Search ............ 423/210 S, 240 S, 242 A, 423/244 A, 276, 277; 65/27, 134

[56] References Cited

U.S. PATENT DOCUMENTS

| | | | |
|---|---|---|---|
| 3,710,548 | 1/1973 | Coughlin | 423/244 R |
| 3,880,629 | 4/1975 | Dulin et al. | 423/244 |
| 3,995,005 | 11/1976 | Teller | 423/240 S |
| 4,145,202 | 3/1979 | Grodin et al. | 65/27 |
| 4,282,019 | 8/1981 | Dunn et al. | 65/27 |
| 4,353,725 | 10/1982 | Hohman et al. | 65/27 |

OTHER PUBLICATIONS

Chemical Abstracts, vol. 91, No. 109620g, "Borates", Senichi Nakamura, (1979).

Primary Examiner—John Doll
Assistant Examiner—Jackson Leed
Attorney, Agent, or Firm—Ronald C. Hudgens; Philip R. Cloutier; Patrick P. Pacella

[57] ABSTRACT

A method of removing boron from gases which comprises passing the gas stream in contact with solid sodium bicarbonate.

5 Claims, 1 Drawing Figure

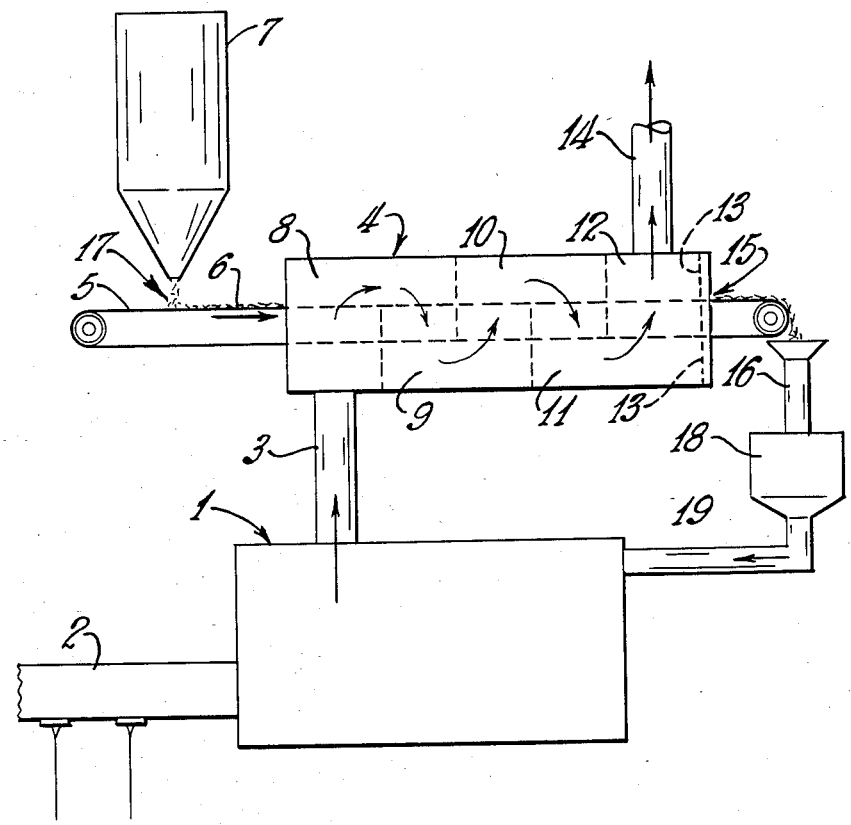

METHOD OF REMOVING BORIC OXIDE FROM FLUE GASES

This invention relates to a method of removing boron from gases.

In one of its more specific aspects, this invention relates to a dry process for removing boron from waste gases.

BACKGROUND OF THE INVENTION

In the production of various waste gases, certain materials are formed which are considered as atmospheric pollutants. One of these materials is boron as contained in various compounds. For example, in the production of glass, the introduction of colemanite and boron compounds into the glass batch and the melting thereof to produce melted glass frequently results in the evolution of boric oxide, which because of the water content of the gases, can actually be present in the form of boric acid.

Various methods have been developed for removing boron from such gases. These methods include, for example, wet scrubbing of the gases with aqueous solutions of various compositions. Such systems, however, have been found to be cumbersome, operationally complex and involve other problems. The method of this invention is directed to the avoidance of such problems.

STATEMENT OF THE INVENTION

According to this invention, there is provided a method of reducing the boron content of gases which method comprises contacting the boron-containing gases with sodium bicarbonate to react the boron-containing compounds with the sodium bicarbonate.

In one embodiment of the invention, the sodium bicarbonate is introduced as a particulate into the gas stream.

In the preferred embodiment of the invention, the sodium bicarbonate is deposited on the surface of a filter medium and the gas stream is passed in contact therewith.

In an additional embodiment of the latter, when the filter element comprises a glass, the glass having adhered to its surface the product resulting from the adsorption of the boron, is introduced into the furnace employed to melt the glass and from which the gases containing the boron emanate.

By "boron," as used herein, is meant any boron-containing compound including boric acid, boric oxide, fluro-boric acid compounds, and the like.

DESCRIPTION OF THE DRAWING

The drawing depicts one embodiment of carrying out the invention.

DETAILED DESCRIPTION OF THE INVENTION

The method of this invention can be used to remove boron in any concentration from any gas stream. Depending upon the initial concentration of the boron in the gas stream, a plurality of contact steps between the sodium bicarbonate and the gas stream may be desirable. As applied to gas streams from glass melting furnaces, the boron concentration will generally be about 0.02 volume percent of the total gas stream and a single step adsorption is generally sufficient.

The method of this invention can be conducted under any pressure conditions and proceeds satisfactorily at temperatures within the range of from about 200° C. to about 700° C. Preferably, the contact between the sodium bicarbonate and the boron-containing gases will be made at temperatures within the range of from about 60° C. to about 500° C. and, preferably, at about 200° C. to about 300° C. at contact times up to about 20 seconds.

In the embodiment in which the sodium bicarbonate is introduced as a powder into the gas stream containing the boron-containing compound, the sodium bicarbonate will be introduced as particles having surface areas within the range of from about 0.03 $m^2$/gm to about 9 $m^2$/gm at contact times up to about two minutes. Preferably, the sodium bicarbonate will be between about 100 to about 325 mesh (U.S. Series) with about 70 weight percent being 325 mesh or less and 12 weight percent being larger than 140 mesh.

If the sodium bicarbonate is introduced as a powder into the gas stream, the gas stream containing the particulate sodium bicarbonate is preferably subsequently passed into filter bags, for example, teflon-coated glass bags, for removal of the particulates prior to venting the treated gas to atmosphere. By this procedure, the injected sodium bicarbonate tends to coat the interior surface of the bag with the result that the removal efficiency of the process is increased.

As an alternate to the above, the fibers comprising the filter bag, which fibers can be of natural or synthetic origin, can be impregnated or coated with the sodium bicarbonate. A combination of sodium bicarbonate injected into the gas stream and sodium bicarbonate impregnated on the fabric filter bags can be employed.

In one embodiment of the method in which the filter element comprises sodium bicarbonate-coated materials, the materials can comprise glass in the form of one or more filter beds in which alternate use of one of the beds is made while the glass fibers of the used, or spent bed, are introduced into the glass melting furnace from which the boron-containing gases emanate.

In another embodiment of the method in which the filter element comprises sodium bicarbonate-coated glass fibers, the fibers can comprise a moveable or moving filter, the used coated glass fibers being introduced into the furnace. This embodiment is depicted in the attached drawing.

Referring now to the drawing, there is shown glass melting furnace 1 from which melted glass is produced through conduit 2 and gases containing boron are discharged through conduit 3.

The gases are conducted into chamber 4 through which travels a continuous foraminous conveyor belt 5. Positioned on the belt is a deposit of glass fibers 6 supplied from reservoir 7. The glass fibers have a coating of sodium bicarbonate positioned on their surface.

Within chamber 4, the gases pass through one or more sections 8, 9, 10, 11 and 12 in each of which sections contact is made between the glass on the conveyor and the gases to affect a single or multiple pass contact system.

The chamber is closed by suitable baffles 13 and the gases pass from the chamber through conduit 14.

The conveyor belt, having the glass and adsorbed boron thereon passes from the chamber through opening 15. The conveyor discharges the glass into conduit 16 and recycles to the glass loading station 17.

The discharged glass is conducted through conduit 16 and, if desired, is comminuted in size reduction means 18 from which it is conducted into the glass melting portion of the furnace through conduit 19.

The following data demonstrate the method of this invention.

A gas of the following composition was passed into contact with a plurality of different sorbents. The composition of the gas was as follows:

| Component | Vol. % |
|---|---|
| $N_2$ | 77.05 |
| $O_2$ | 2.15 |
| $CO_2$ | 8.53 |
| $H_2O$ | 12.17 |
| NO | 0.053 |
| $SO_2$ | 0.010 |
| HF | 0.042 |
| B as $H_3BO_3$ | 0.023 |

This gas was passed in contact with the individual materials indicated at various temperatures for periods of two hours. The sorbiton per hundred grams of sorbent was then measured as follows:

| Sorbent | Temperature, °C. | Sorption g/100 g sorbent | | |
|---|---|---|---|---|
| | | $B_2O_3$ | $SO_2$ | HF |
| $NaHCO_3$ | 700 | 20 | 7.3 | 8.9 |
| | 480 | 22 | 9.3 | 16 |
| | 300 | 22 | 5.8 | 8.4 |
| | 200 | 26 | 6.9 | 33.7 |
| $Ca(OH)_2$ | 700 | 8.0 | 4.8 | 10.8 |
| | 480 | 5.6 | 0.8 | 18 |
| | 300 | 4.8 | <0.3 | 25 |
| $CaCO_3$ | 700 | 6.6 | 3.5 | 10.6 |
| | 480 | 0.5 | 0.1 | 1 |
| | 300 | 1.2 | <0.3 | 6.0 |
| CaO | 700 | 15.4 | 9.2 | 15.0 |

These data indicate the effectiveness of the sodium bicarbonate in sorbing boron-containing compounds from gases as compared to other sorbents and indicate that the sodium bicarbonate is effective in such sorbtion from sulfur dioxide and hydrogen fluoride-containing gases.

It will be evident from the foregoing that various modifications can be made to the method of this invention. Such, however, are considered within the scope of the invention.

We claim:

1. A method of reducing the boron content of a gas stream from a glass melting furnace which comprises passing said gas stream into contact with a moving bed of sodium bicarbonate-coated glass fibers to reduce the boron content of said stream and continuously introducing the coated glass fibers into said glass melting furnace.

2. The method of claim 1 in which said coated glass fibers are positioned on a foraminous belt.

3. The method of claim 1 in which said gas stream is passed into contact with said coated glass fibers in a multiple pass contact system.

4. The method of claim 2 in which said glass fibers are comminuted prior to the introduction into said glass furnace.

5. The method of claim 1 in which sodium carbonate is introduced into said gas stream prior to the contact of said gas stream with said moving bed.

* * * * *